(12) United States Patent
Longeliere

(10) Patent No.: US 10,927,868 B2
(45) Date of Patent: Feb. 23, 2021

(54) DECORATIVE COVER ASSEMBLY FOR VEHICLE

(71) Applicant: Image Builders Marketing, Inc., Jenison, MI (US)

(72) Inventor: David Dale-James Longeliere, Grand Haven, MI (US)

(73) Assignee: IMAGE BUILDERS MARKETING, INC., Jenison, MI (US)

( * ) Notice: Subject to any disclaimer, the term of this patent is extended or adjusted under 35 U.S.C. 154(b) by 84 days.

(21) Appl. No.: 16/162,697

(22) Filed: Oct. 17, 2018

(65) Prior Publication Data

US 2019/0234438 A1 Aug. 1, 2019

Related U.S. Application Data

(60) Provisional application No. 62/625,043, filed on Feb. 1, 2018.

(51) Int. Cl.
| | |
|---|---|
| *F16B 1/00* | (2006.01) |
| *H04B 1/3888* | (2015.01) |
| *H04M 1/02* | (2006.01) |
| *B60R 13/04* | (2006.01) |
| *B60R 13/00* | (2006.01) |
| *A45C 11/00* | (2006.01) |
| *H04M 1/04* | (2006.01) |
| *B62J 50/40* | (2020.01) |

(52) U.S. Cl.
CPC ............... *F16B 1/00* (2013.01); *B60R 13/00* (2013.01); *B60R 13/04* (2013.01); *H04B 1/3888* (2013.01); *H04M 1/0283* (2013.01); *A45C 2011/002* (2013.01); *B62J 50/40* (2020.02); *F16B 2001/0035* (2013.01); *H04M 1/04* (2013.01)

(58) Field of Classification Search
CPC ............... A45C 11/00; A45C 13/1069; A45C 2011/002; B60R 13/00; B60R 13/04; B62J 50/40; F16B 1/00; F16B 2001/0035; H04B 1/3888; H04M 1/0283; H04M 1/04
See application file for complete search history.

(56) References Cited

U.S. PATENT DOCUMENTS

| | | | | |
|---|---|---|---|---|
| 5,671,967 A | * | 9/1997 | Gurganus | ............ B60R 13/0206 296/146.9 |
| 9,706,829 B2 | * | 7/2017 | Tilney | ........................ A45F 5/00 |
| 10,380,383 B2 | * | 8/2019 | Li | ............................ G02B 5/203 |
| 2013/0329173 A1 | * | 12/2013 | Jung | .................... H04B 1/3838 349/122 |
| 2015/0097558 A1 | * | 4/2015 | Jin | ........................ H04B 1/3888 324/226 |
| 2015/0189962 A1 | * | 7/2015 | Yeo | ........................ A45C 11/00 361/679.17 |
| 2016/0106202 A1 | * | 4/2016 | Ford | .................... H04N 19/105 224/267 |
| 2017/0128868 A1 | * | 5/2017 | Simmons | ........... B01D 46/0005 |
| 2018/0073252 A1 | * | 3/2018 | Janko | ...................... A47G 3/00 |

* cited by examiner

*Primary Examiner* — Robert Sandy
*Assistant Examiner* — David M Upchurch
(74) *Attorney, Agent, or Firm* — Honigman LLP

(57) ABSTRACT

A cover assembly for a component includes a base configured to be fixedly mounted to the component. A plurality of magnets are disposed at the base and a cover is configured to magnetically detachably attach at the base when the base is fixedly mounted to the component.

19 Claims, 20 Drawing Sheets

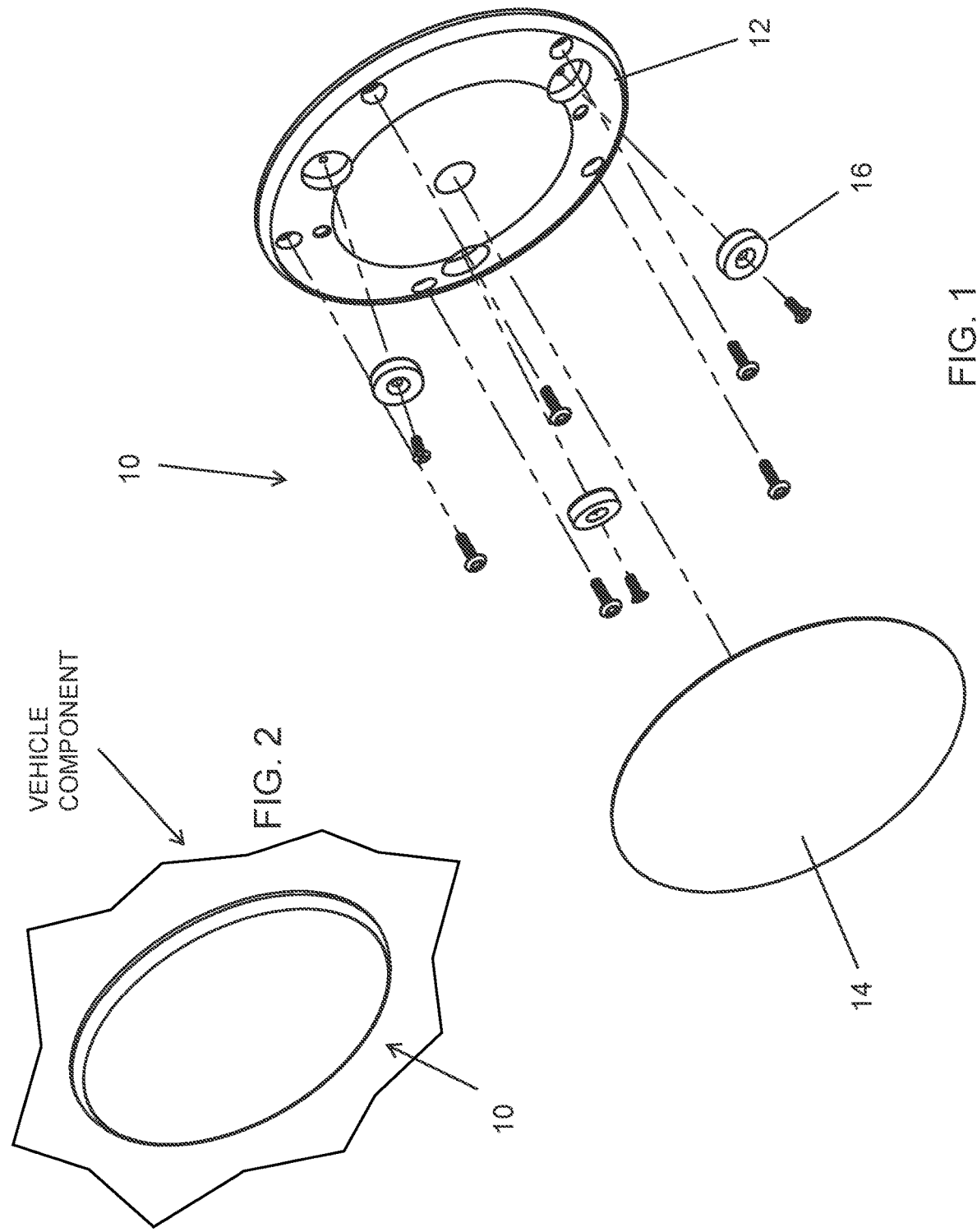

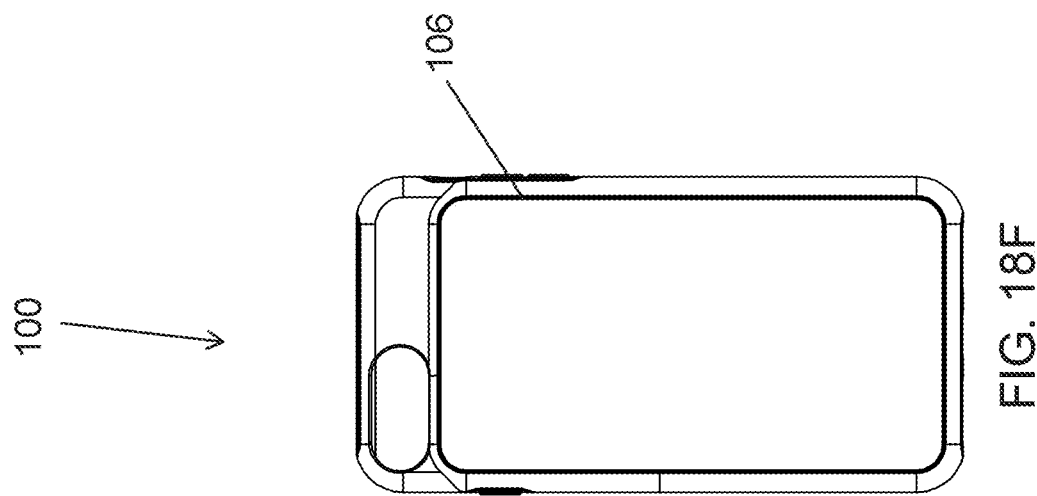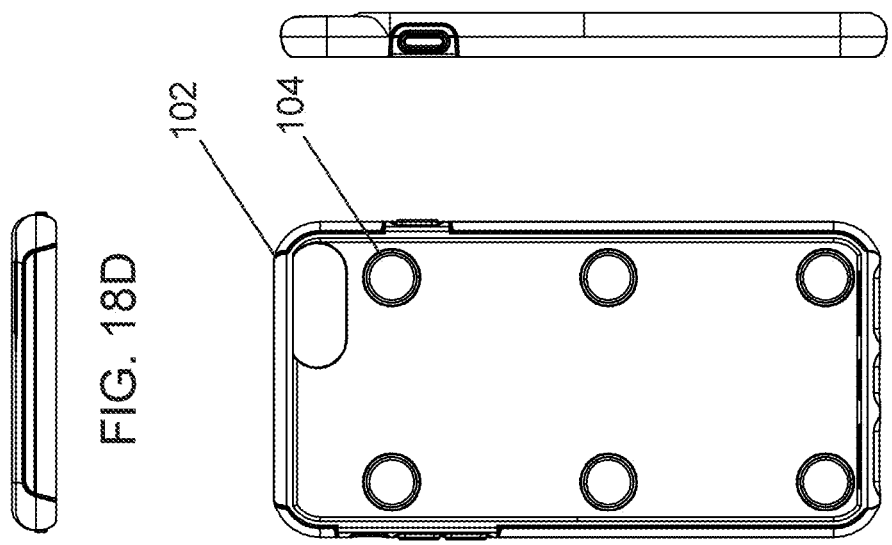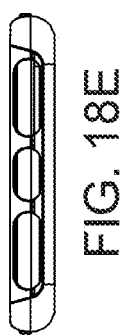

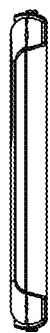
FIG. 22D
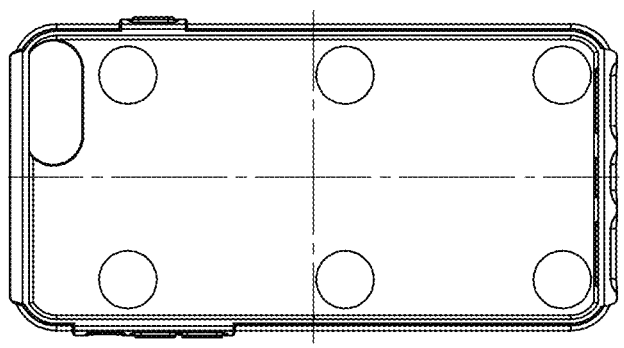
FIG. 22C
FIG. 22A
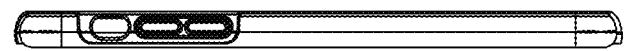
FIG. 22B
FIG. 22E

DECORATIVE COVER ASSEMBLY FOR VEHICLE

CROSS REFERENCE TO RELATED APPLICATION

The present application claims the filing benefits of U.S. provisional application Ser. No. 62/625,043, filed Feb. 1, 2018, which is hereby incorporated herein by reference in its entirety.

FIELD OF THE INVENTION

The present invention relates generally to decorative covers or elements for vehicles to allow a vehicle owner to customize the appearance of a portion or component of his or her vehicle.

BACKGROUND OF THE INVENTION

It is known to provide a decorative element at a vehicle or vehicle component. Such decorative elements are bolted directly to the vehicle or vehicle component to provide a decorative or customized appearance of the vehicle or vehicle component.

SUMMARY OF THE INVENTION

The present invention provides a decorative cover assembly that has a base that fixedly or semi-permanently mounts to a vehicle or vehicle component and allows the owner or user of the vehicle to select and detachably attach a selected decorative cover at the base. The cover is magnetically attached at the base and can be readily removed from the base (which is bolted to the vehicle) to allow the user to change the appearance of the vehicle by switching to a different decorative cover. The cover may be removed from the magnetic base via a suction cup device or the like.

These and other objects, advantages, purposes and features of the present invention will become apparent upon review of the following specification in conjunction with the drawings.

BRIEF DESCRIPTION OF THE DRAWINGS

FIG. 1 is an exploded perspective view of a derby cover assembly in accordance with the present invention;

FIG. 2 is a perspective view of the derby cover assembly of FIG. 1, as assembled, shown with the derby cover assembly attached at a vehicle component;

FIG. 18A is front view of a case for a portable electronic device;

FIGS. 18B and 18C are side views of the case of FIG. 18A;

FIG. 18D is a plan view of the case of FIG. 18A;

FIG. 18E is a bottom view of the case of FIG. 18A;

FIG. 18F is a back view of the case of FIG. 18A showing a vanity or decorative plate at an inset or recess at the rear of the case in accordance with the present invention;

FIG. 22A is a front view of another case for a portable electronic device;

FIGS. 22B and 22C are side views of the case of FIG. 22A;

FIG. 22D is a plan view of the case of FIG. 22A;

FIG. 22E is a bottom view of the case of FIG. 22A;

DESCRIPTION OF THE PREFERRED EMBODIMENTS

Figure 3:
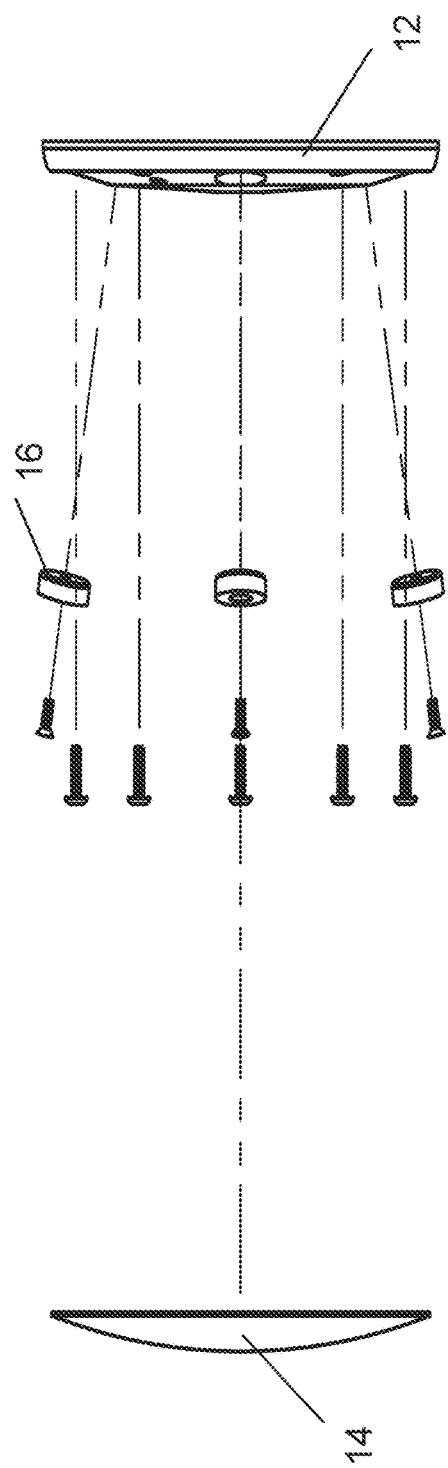
FIG. 3 is an exploded side view of the cover assembly.
Figure 4:
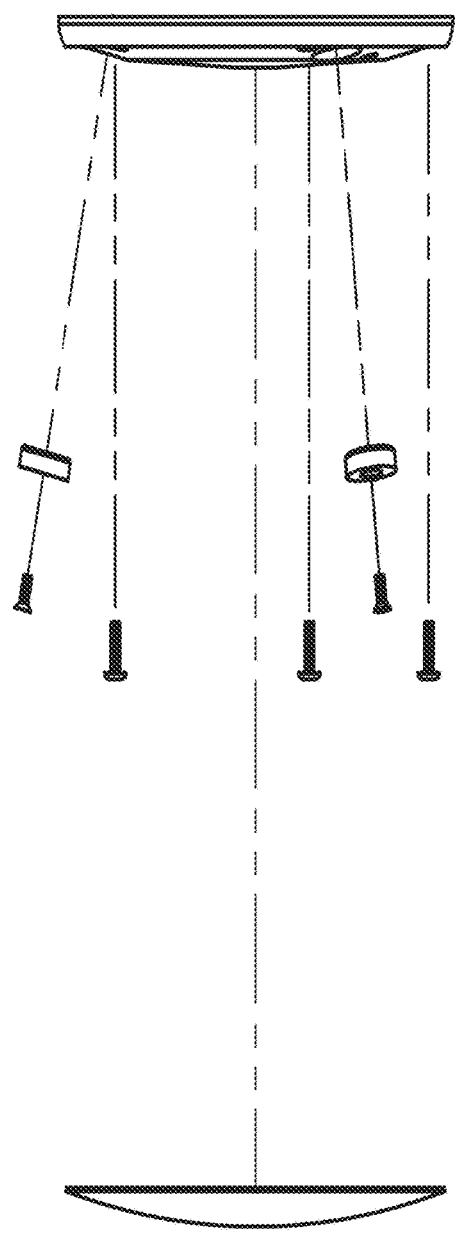
FIG. 4 is another exploded side view of the cover assembly.

Referring now to the drawings and the illustrative embodiments depicted therein, a decorative cover assembly is configured to mount to a vehicle (or vehicle component or other structure, as discussed below) and to allow for easy changeover from one decorative exterior element or cover to another, such that the user can readily change or customize the appearance of the vehicle or component thereof. The cover assembly 10 includes a base 12 that is configured to be bolted or otherwise fixedly or permanently attached at the vehicle component, and a cover 14 that is configured to be detachably attached to the base to allow for selective customization of the appearance of the vehicle or component. The base includes a plurality (such as three, as shown in the illustrated embodiment) of magnets or magnetic elements 16 attached thereat (such as via respective fasteners), and the cover element comprises a metallic cover that magnetically attaches at the magnets and base.

Figure 5:
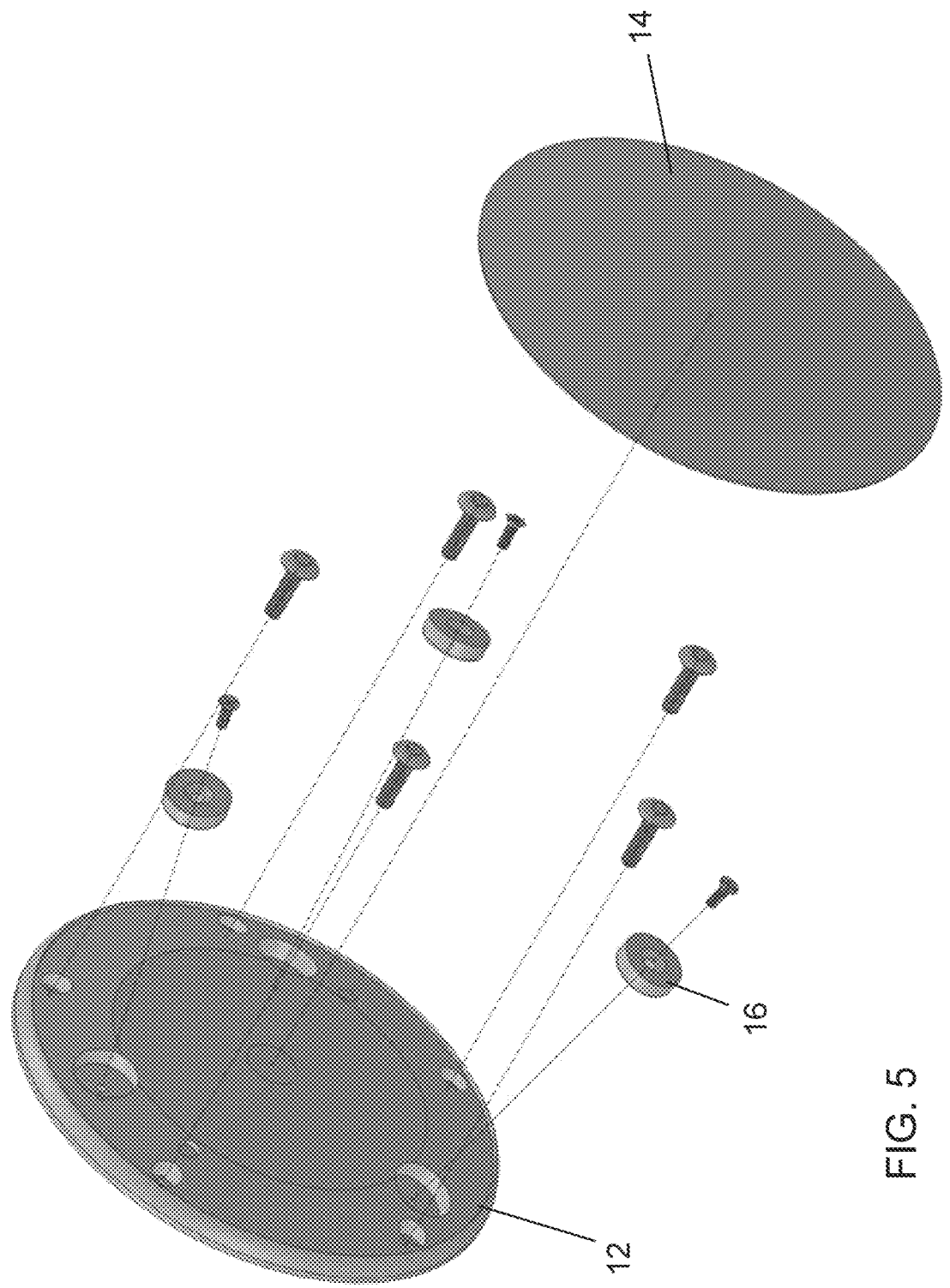
FIG. 5 is another exploded perspective view of the cover assembly.
Figure 6:
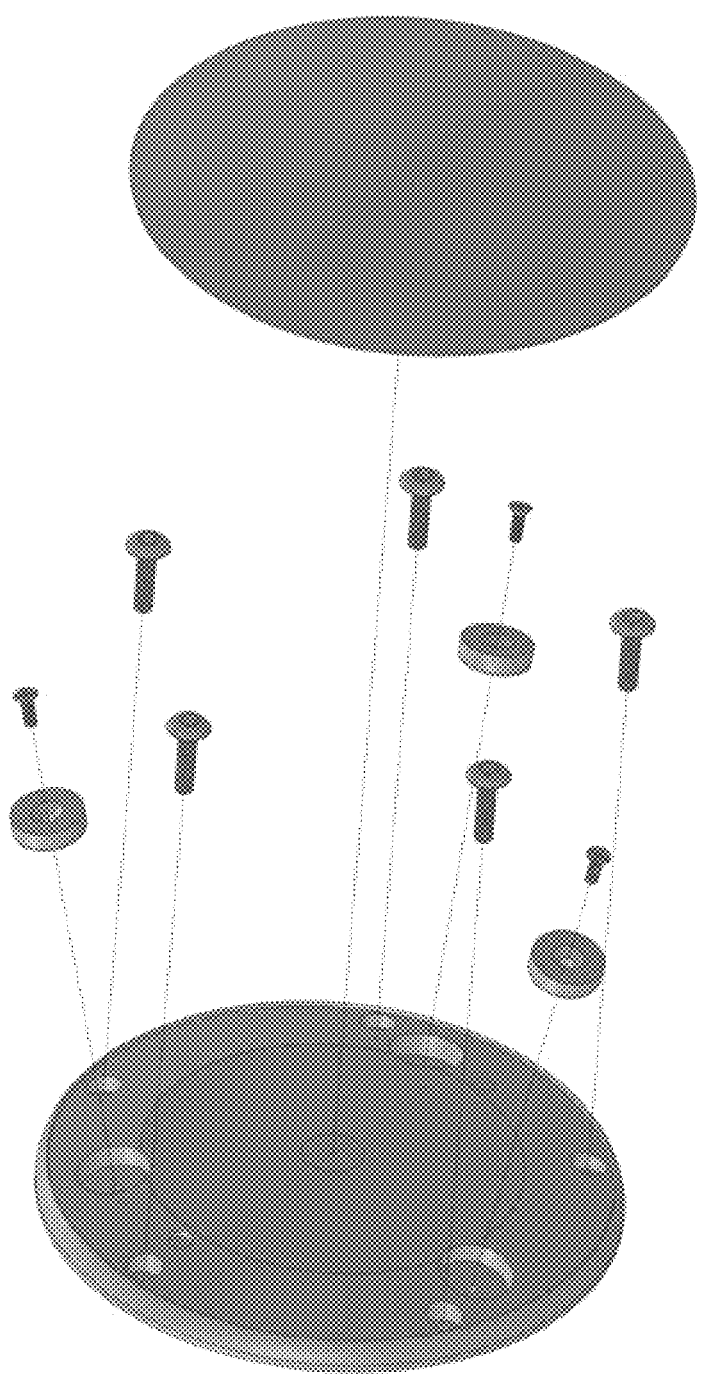
FIG. 6 is another exploded perspective view of the cover assembly.
Figure 7:
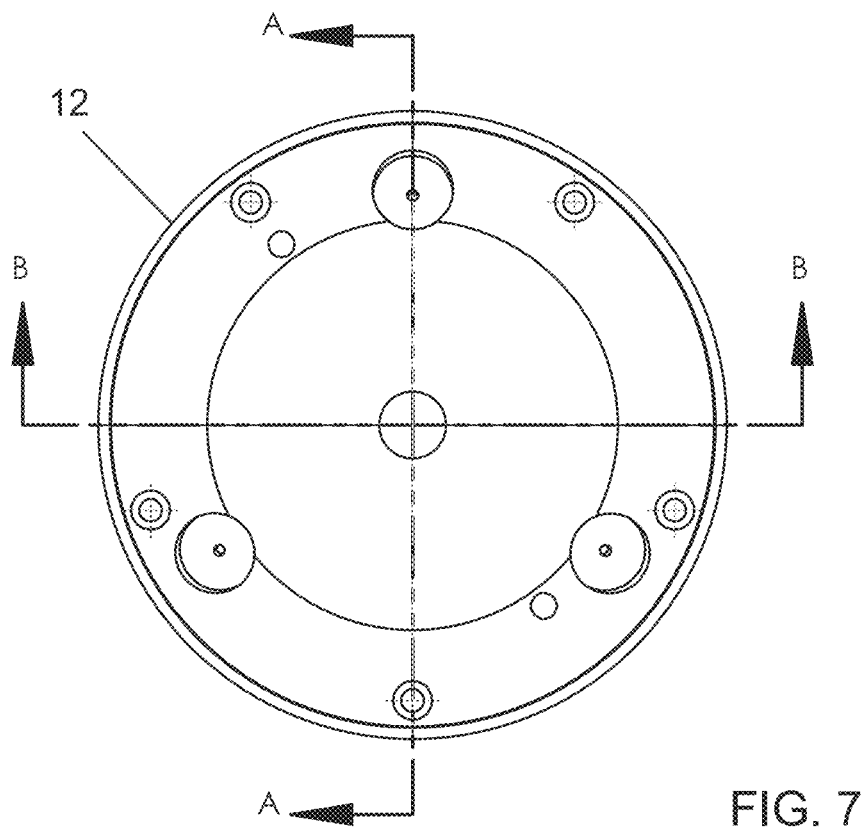
FIG. 7 is a plan view of the base of the cover assembly.
Figure 7A:
FIG. 7A is a sectional view of the base taken along the line A-A in FIG. 7.
Figure 7B:
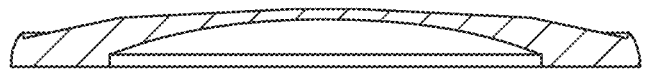
FIG. 7B is a sectional view of the base taken along the line B-B in FIG. 7.
Figures 8, 9:
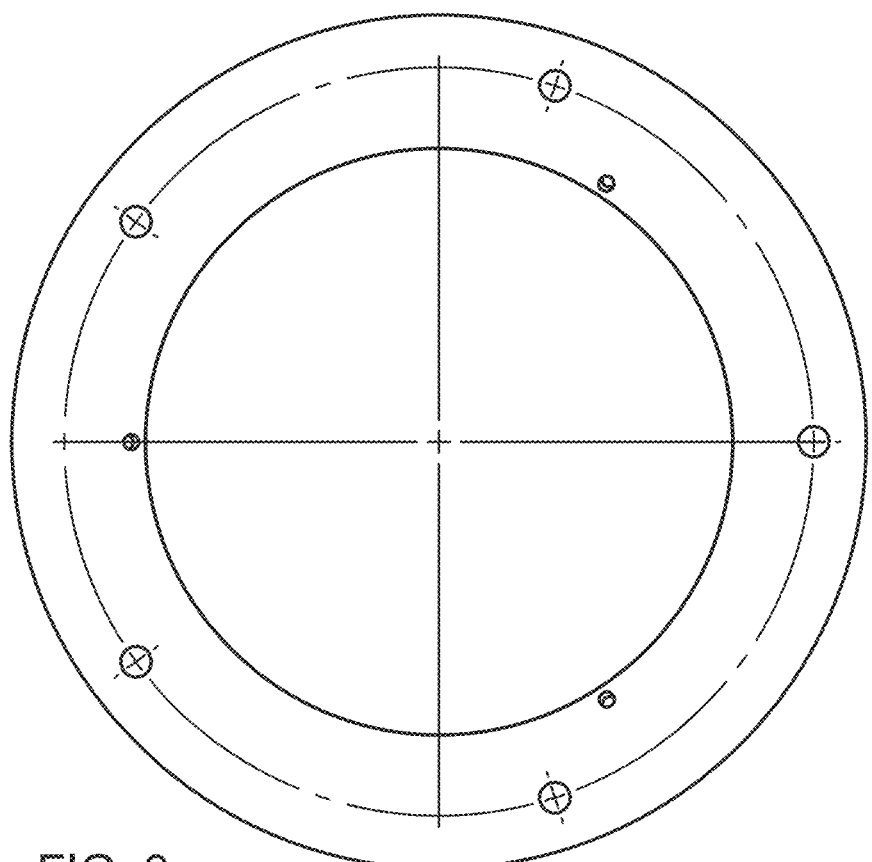
FIG. 8 is a side view of the base.
FIG. 9 is a back view of the base.
Figure 11:
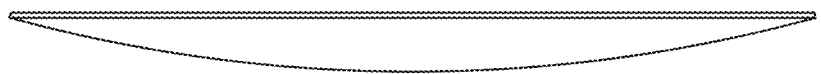
FIG. 11 is a side view of the cover.
Figure 10A:
FIG. 10A is a sectional view of the cover taken along the line A-A in FIG. 10.
Figure 10:
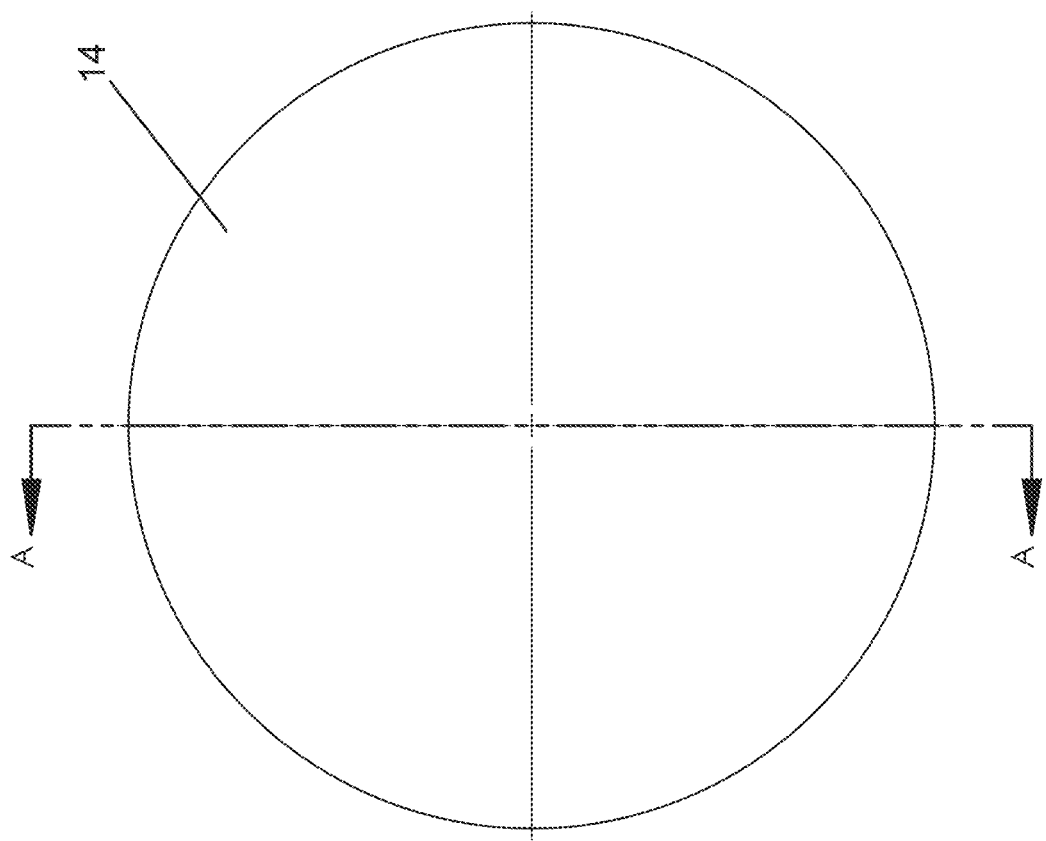
FIG. 10 is a plan view of the cover.
Figure 12:
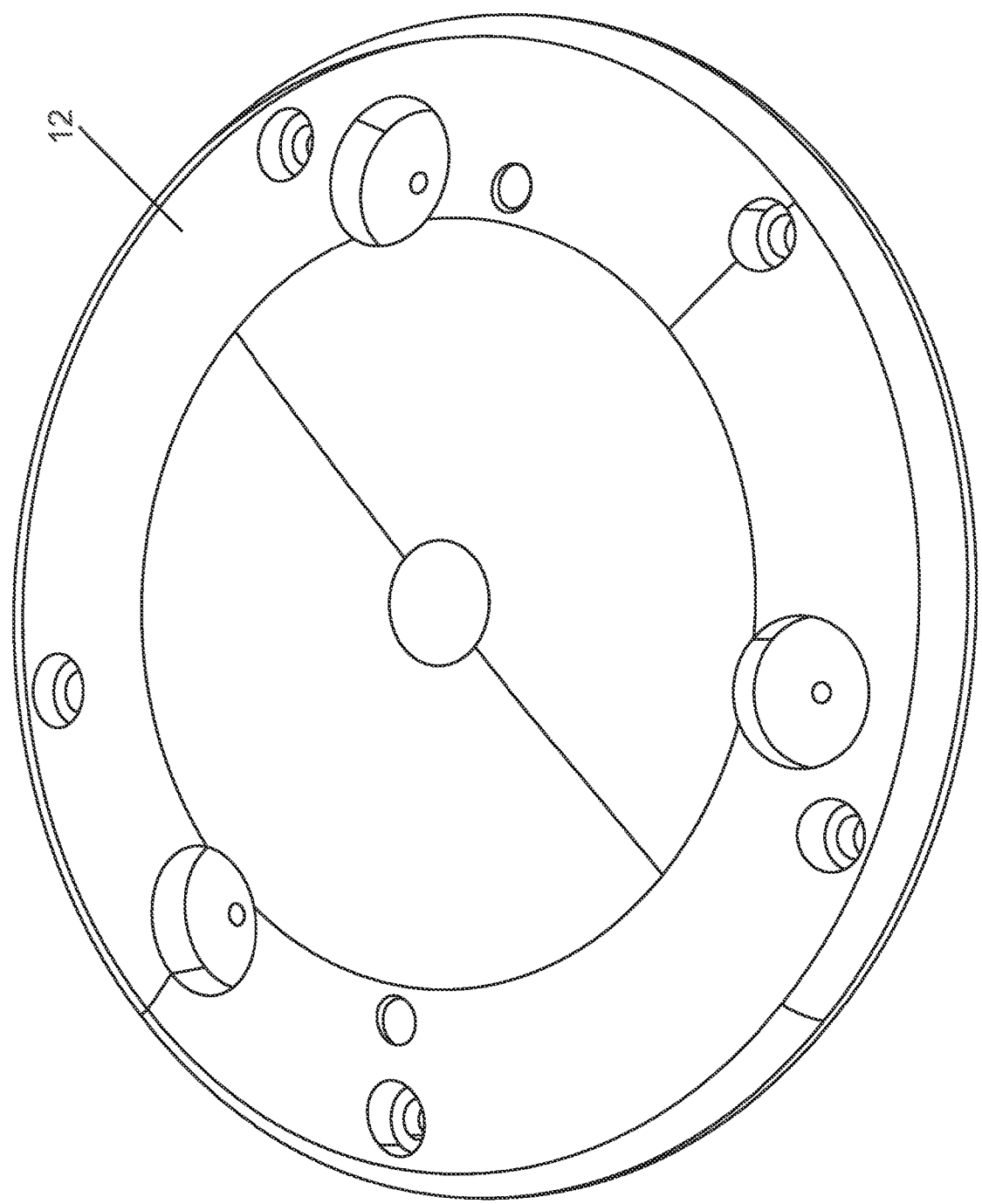
FIG. 12 is a perspective view of the base, with the magnets removed therefrom.
Figure 13:
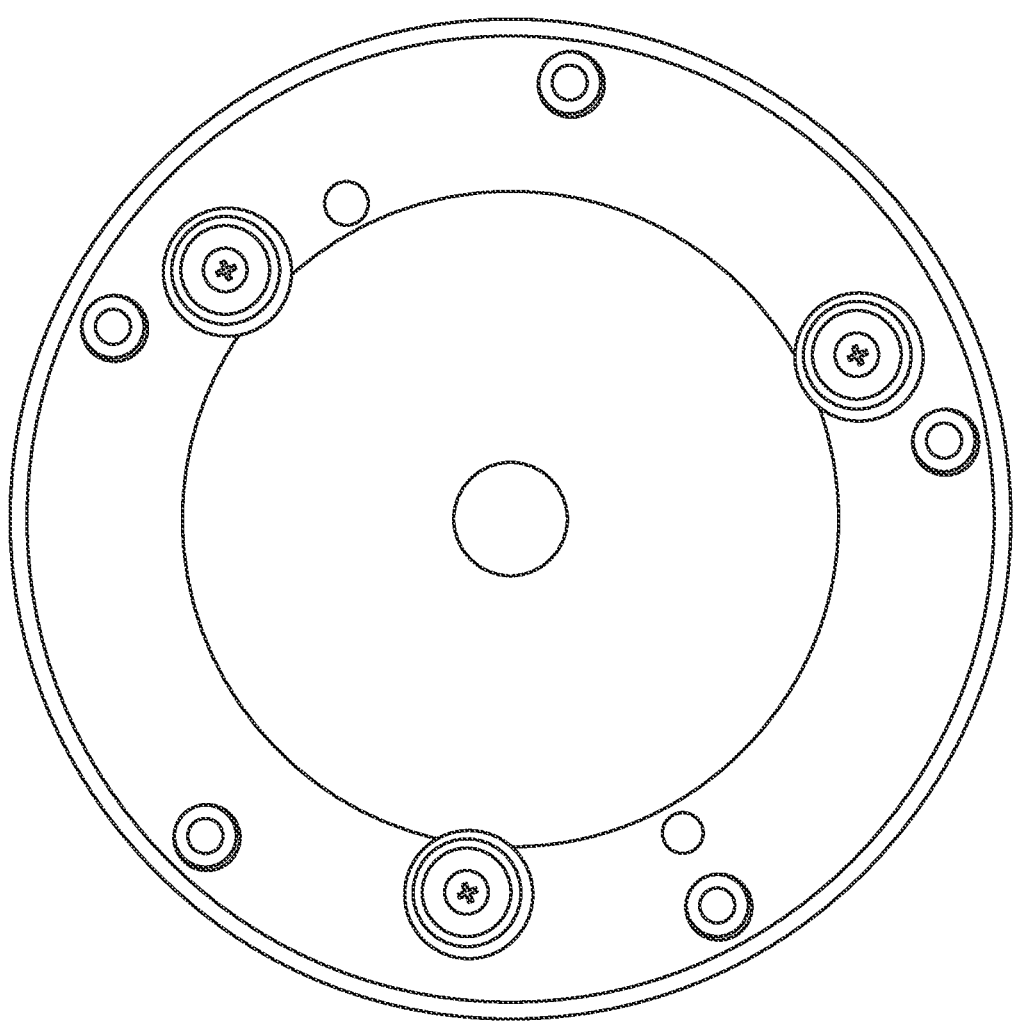
FIG. 13 is another plan view of the base, with the magnets installed.
Figure 14:
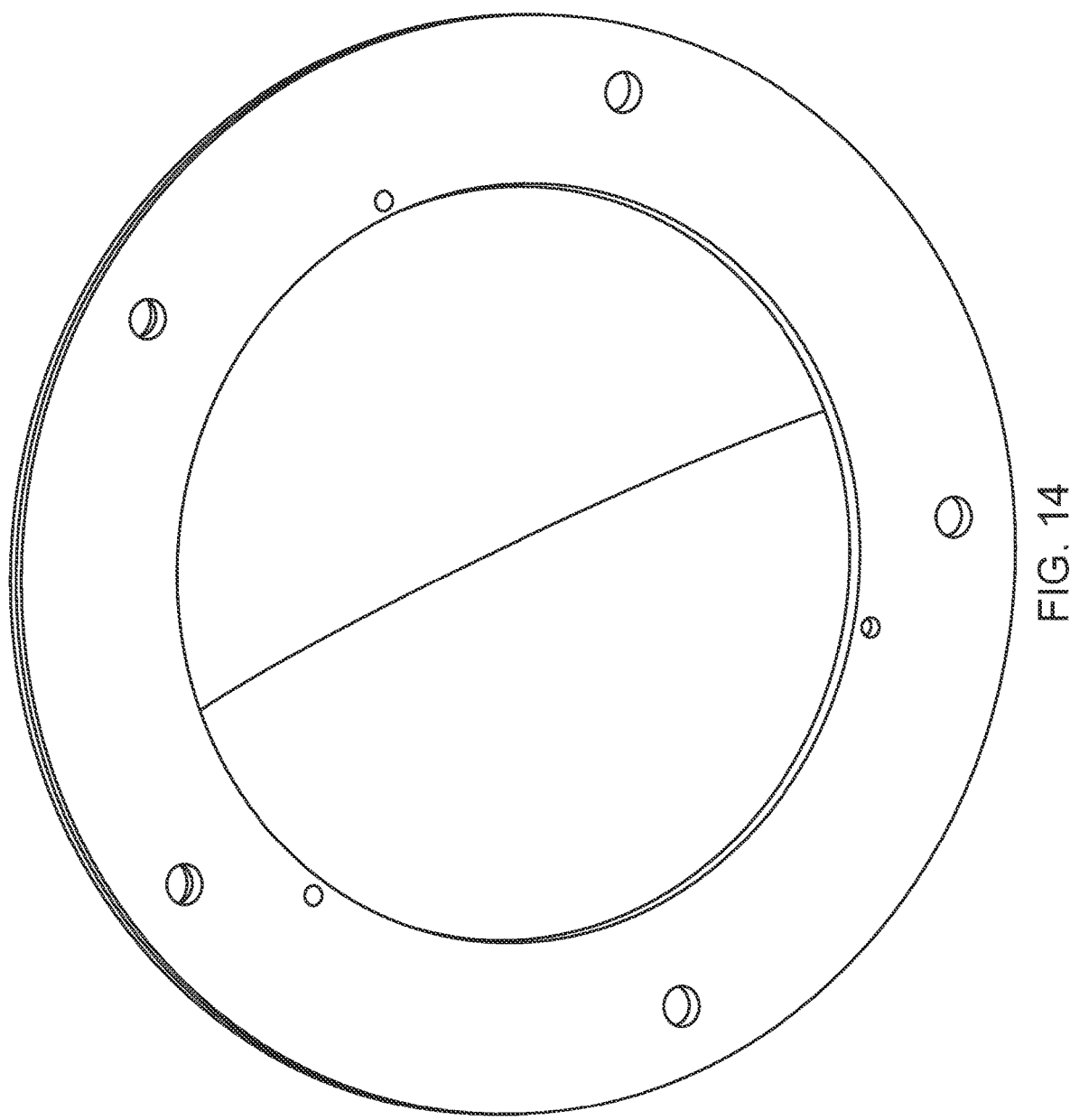
FIG. 14 is another back view of the base.
Figure 15:
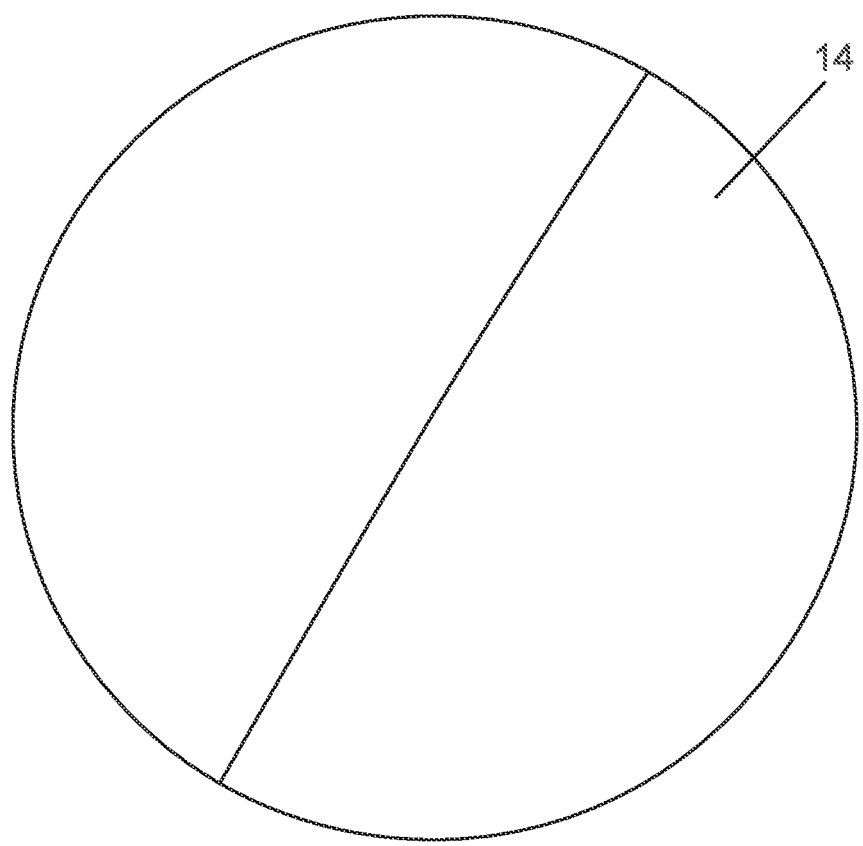
FIG. 15 is another plan view of the cover.
Figure 16:
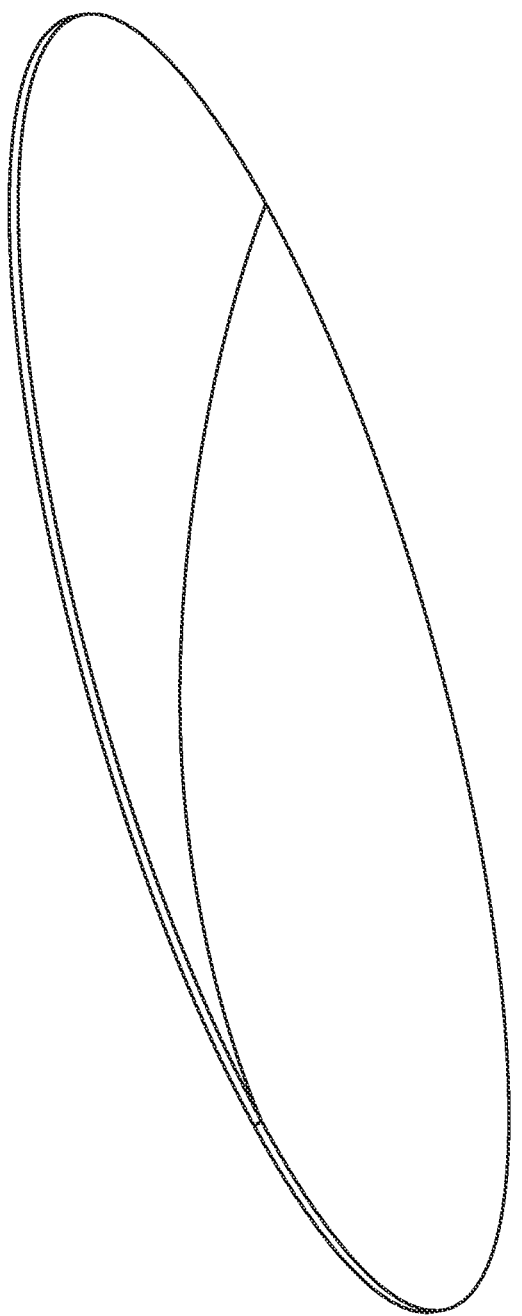
FIGS. 16 and 17 are perspective views of the cover.
Figure 17:
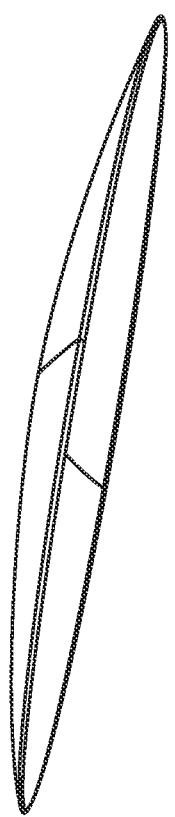
Figure 19B:
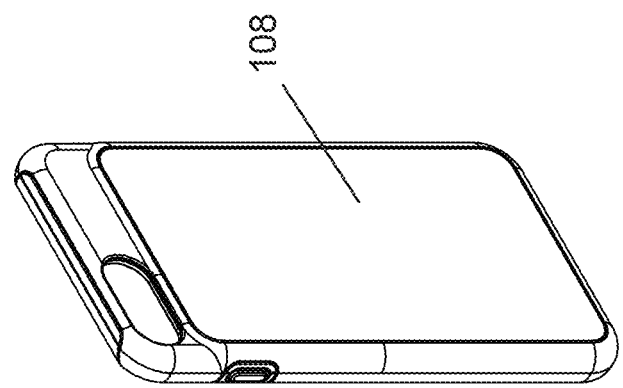
FIGS. 19A and 19B are perspective views of the case of FIG. 18A.
Figure 19A:
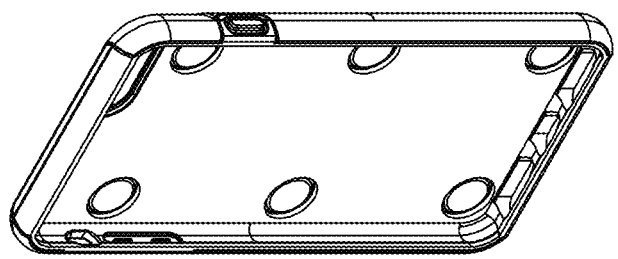
Figure 20G:
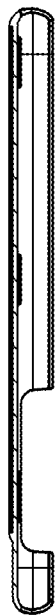
FIG. 20G is a sectional view of the case of FIG. 20A.
Figure 20F:
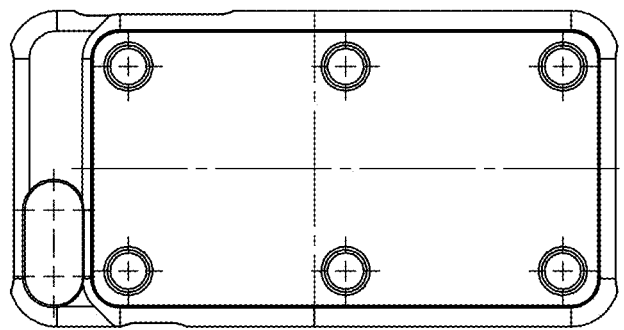
FIG. 20F is a back view of the case of FIG. 20A showing an inset for a vanity or decorative plate in accordance with the present invention.
Figure 20C:
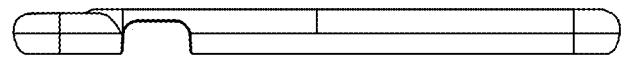
FIGS. 20B and 20C are side views of the case of FIG. 20A.
Figure 20D:
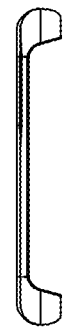
FIG. 20D is a plan view of the case of FIG. 20A.
Figure 20A:
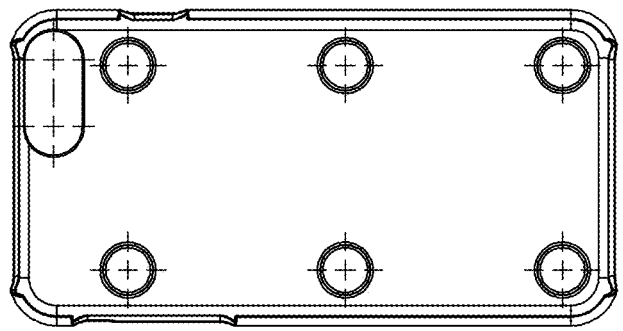
FIG. 20A is a front view of another case for a portable electronic device.
Figure 20E:
FIG. 20E is a bottom view of the case of FIG. 20A.
Figure 20B:
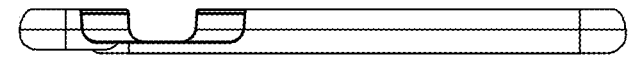
Figure 21B:
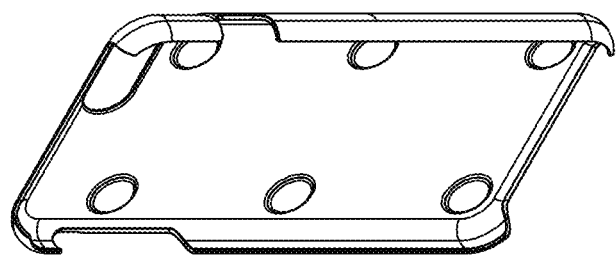
FIGS. 21A and 21B are perspective views of the case of FIG. 20A.
Figure 21A:
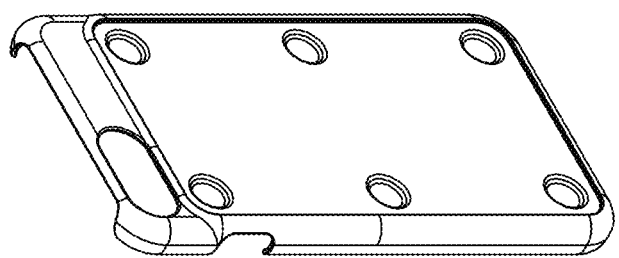
Figures 22F, 22G:
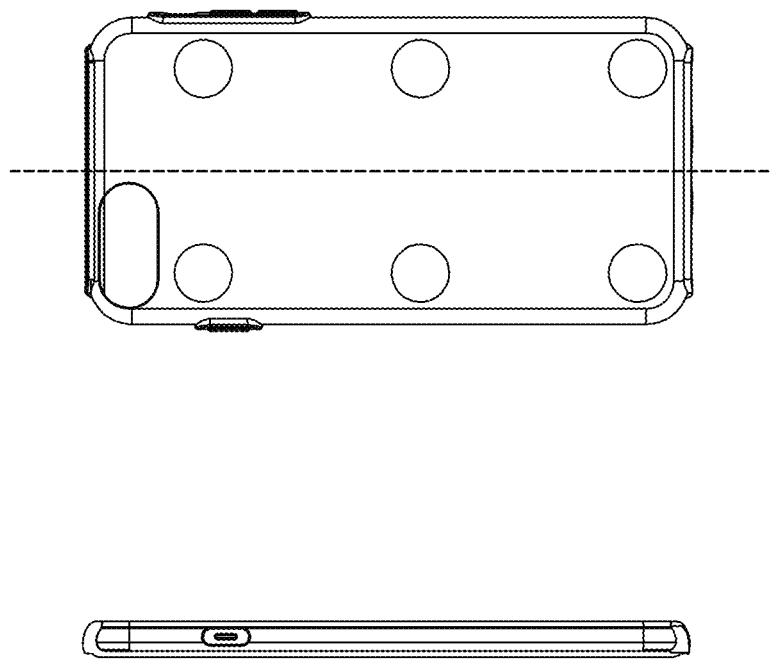
FIG. 22F is a side view of the case of FIG. 22A.
FIG. 22G is a back view of the case of FIG. 22A showing an inset for a vanity or decorative plate in accordance with the present invention.

In the illustrated embodiment, the magnets 16 are attached at respective recesses at the base with respective fasteners. As best shown in FIGS. 5 and 6, the magnets may comprise circular disks with holes therethrough to allow the respective fastener to attach the magnet at the recessed portions of the base.

The base is attached at the vehicle component via a plurality (such as five as illustrated) fasteners or bolts to fixedly secure the base at the vehicle. The outer surface of the base may be curved to generally correspond with the inner surface of the cover, such that the cover, when attached at the base, nests against the outer surface of the base. Optionally, the magnets may have outer curved surfaces to mate with the inner curved surface of the cover to increase the contact area of the magnets and cover and to limit or minimize any potential movement of the cover relative to the magnets and base.

In the illustrated embodiment, the cover comprises a curved circular disk that is shaped to provide the desired exterior contour at the vehicle component. In the illustrated embodiment, the cover assembly is configured as a derby cover for a motorcycle (but clearly could be otherwise shaped or configured for other vehicle components or structures or the like). For example, the original derby cover may be removed and the base mounted at the motorcycle in a fixed permanent manner (via the plurality of bolts, such as five bolts), and a selected cover may be magnetically detachably attached at the base. Thus, a user can purchase a variety of covers (which comprise thin metallic discs) and can readily select and attach a cover to provide the desired appearance.

The magnets are selected to provide sufficient magnetic attraction at the cover to securely retain the metallic cover at the base. For example, the cover assembly may require a retraction force at the cover of about 30 pounds or more (preferably greater than about 60 pounds and more preferably greater than about 80 pounds) to overcome the magnetic attraction and remove the cover from the base. The cover may be removed from the base via a suction cup device that suctions to the exterior surface of the cover to allow a user to pull the cover from the base to replace the cover with a different selected cover.

Although shown and described as being configured for a derby cover for a motorcycle, aspects of the present invention are applicable to other applications, while remaining within the spirit and scope of the present invention. For example, the cover assembly may be configured as a points cover, a cam cover, a cowling cover or emblem, a gas cap cover, a wheel cover, a horn cover, or the like. The cover may be for a motorcycle component or for other vehicle applications, such as a car or truck or boat or golf cart or the like.

It is further envisioned that aspects of the present invention may be applicable to non-vehicle applications, such as for a cover of a mobile device or portable electronic device, such as a smart phone or the like. In such an application, the base may be a case for the mobile device, and the cover may be detachably attached at the base or case to provide a customizable and changeable appearance of the mobile device.

Figure 23B:
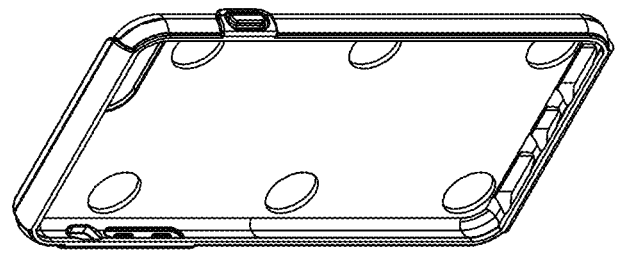
FIGS. 23A and 23B are perspective views of the case of FIG. 22A.
Figure 23A:
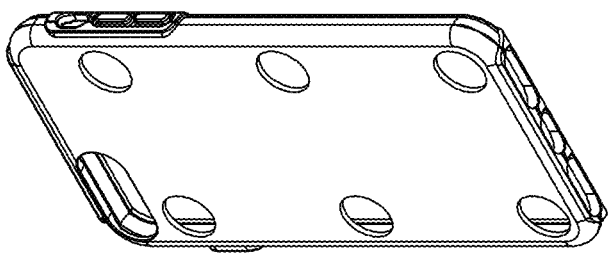

For example, and with reference to FIGS. 18A-23B, an aspect of the present invention includes a case 100 for a portable electronic device (e.g., a mobile phone). The case 100 includes a cover 102 that is configured to be mounted to a portable electronic device. A plurality of magnets 104 are disposed at the cover 102, and the magnets 104 are configured to magnetically attach and detach a vanity or decorative plate 106 at the cover 102. The magnets 104 allow the vanity plate 106 to be easily and quickly added and removed to the cover 102. Because the vanity plate may include any manner of design, a user's phone may quickly adopt any number of artistic designs. The cover may have a recess or inset 108 to secure the vanity plate 106 when attached to the cover 102. The case 100 may take any shape to conform to the requirements of a respective mobile device. For example, the case 100 may include coverings for user inputs (e.g., buttons) of the phone (FIGS. 18A-19B). The case 100 may also include cutouts for the user inputs (FIGS. 20A-21B). The magnets 104 may be recessed into the cover 102 as shown in FIGS. 18A-19B, with no part of the magnets 104 exposed or viewable at the back of the cover 102. Optionally, the magnets 104 may protrude from either the front or back of the case 100, such as shown in FIGS. 20A-21B. Optionally, the magnets 104 may be received in tapered apertures or recesses in the case 100 (such as shown in FIGS. 19A, 21A, 21B), or the magnets 104 may comprise cylindrical elements that are received and retained at apertures in or through the case (such as shown in FIGS. 23A, 23B).

The case may include any number of magnets. For example, the case may include six magnets, as shown. However, any number of magnets may be disposed at the case, such as one or more magnets, depending on the particular application. The magnets may be disposed in any pattern on or in the cover. For example, the magnets may be disposed at specific locations to best suit a specific mobile device (i.e., to better secure the vanity plate or to avoid interference with mobile device functions).

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A cover assembly for a component, said cover assembly comprising:
    a base configured to be fixedly mounted to the component;
    wherein said base comprises a plurality of recesses established at an outer surface of said base;
    a plurality of magnets disposed within respective ones of said plurality of recesses at the outer surface of said base;
    wherein said plurality of magnets are disposed within said plurality of recesses such that an outer surface of each magnet does not protrude beyond the outer surface of said base;
    a cover configured to magnetically detachably attach at said base via said plurality of magnets when said base is fixedly mounted to the component;
    wherein said cover comprises a curved disc; and
    wherein said outer surface of said base comprises a curved outer surface and wherein an inner surface of said cover comprises a curved inner surface that opposes said curved outer surface of said base when said cover is magnetically detachably attached at said base.

2. The cover assembly of claim 1, wherein said base is fixedly mounted to the component via a plurality of fasteners.

3. The cover assembly of claim 1, wherein said magnets are attached at said base via respective fasteners.

4. The cover assembly of claim 1, wherein said curved inner surface of said cover corresponds to said curved outer surface of said base.

5. The cover assembly of claim 1, wherein the component comprises a component of a vehicle.

6. The cover assembly of claim 5, wherein said cover assembly comprises a derby cover for a motorcycle.

7. The cover assembly of claim 1, wherein the component comprises a portable electronic device.

8. A case for a portable electronic device, the case comprising:
- a cover configured to be mounted to the portable electronic device;
- a plurality of magnets disposed at the cover;
- wherein the plurality of magnets are disposed at recesses in the cover;
- wherein the plurality of magnets are recessed such that a top surface of each magnet is flush with a top surface of the cover;
- a vanity plate that magnetically detachably attaches at the cover via the plurality of magnets;
- wherein an outer surface of the cover opposes an inner surface of the vanity plate when the vanity plate is magnetically detachably attached at the cover; and
- wherein an outer surface of the vanity plate is exposed when the vanity plate is magnetically detachably attached at the cover.

9. The portable electronic device of claim 8, wherein the plurality of magnets comprises six magnets.

10. The case of claim 8, wherein the portable electronic device comprises a mobile phone.

11. The case of claim 8, wherein the cover receives the portable electronic device therein, and wherein the magnets retain the portable electronic device in the cover.

12. A vehicular cover assembly, said cover assembly comprising:
- a vehicle component for a vehicle;
- a base configured to be fixedly mounted to the vehicle component via a plurality of fasteners;
- a plurality of magnets disposed at said base;
- a cover configured to magnetically detachably attach at said base when said base is fixedly mounted to the vehicle component;
- wherein an inner surface of said cover corresponds to an outer surface of said base; and
- wherein said plurality of magnets are disposed at recesses at the outer surface of said base such that outer surfaces of said magnets correspond with the outer surface of said base.

13. The vehicular cover assembly of claim 12, wherein said magnets are attached at said base via respective fasteners.

14. A cover assembly for a vehicle component, said cover assembly comprising:
- a base configured to be fixedly mounted to the vehicle component via a plurality of fasteners;
- a plurality of magnets disposed at said base;
- a cover configured to magnetically detachably attach at said base when said base is fixedly mounted to the vehicle component;
- wherein said cover comprises a curved disc;
- wherein an inner curved surface of said cover corresponds to an outer curved surface of said base; and
- wherein said plurality of magnets are disposed at recesses at the outer curved surface of said base such that outer surfaces of said magnets do not protrude beyond the outer curved surface of said base.

15. The vehicular cover assembly of claim 12, wherein said cover assembly comprises a derby cover for a motorcycle.

16. The vehicular cover assembly of claim 15, wherein said base comprises a circular component, and wherein said fasteners are spaced circumferentially around said base.

17. The vehicular cover assembly of claim 16, wherein heads of said fasteners are received in recesses of said base so that the heads of said fasteners do not contact said inner surface of said cover when said cover is magnetically detachably attached at said base.

18. The cover assembly of claim 14, wherein said cover assembly comprises a derby cover for a motorcycle.

19. The cover assembly of claim 14, wherein said inner curved surface of said cover opposes said outer curved surface of said base when said cover is magnetically detachably attached at said base.

* * * * *